(12) United States Patent
Nandy et al.

(10) Patent No.: US 10,666,558 B2
(45) Date of Patent: May 26, 2020

(54) AUTOMATIC ALIGNMENT OF ROLES OF ROUTERS IN NETWORKS

(71) Applicant: Hewlett Packard Enterprise Development LP, Houston, TX (US)

(72) Inventors: Tathagata Nandy, Bangalore (IN); Nilay Tripathi, Bangalore (IN); Sarita Patra, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 39 days.

(21) Appl. No.: 15/866,824

(22) Filed: Jan. 10, 2018

(65) Prior Publication Data

US 2019/0215264 A1 Jul. 11, 2019

(51) Int. Cl.
| | | |
|---|---|---|
| *H04L 12/753* | (2013.01) | |
| *H04L 12/24* | (2006.01) | |
| *H04L 12/18* | (2006.01) | |
| *H04L 12/773* | (2013.01) | |
| *H04L 12/751* | (2013.01) | |
| *H04L 12/66* | (2006.01) | |
| *H04L 12/775* | (2013.01) | |
| *H04L 12/761* | (2013.01) | |
| *H04L 12/26* | (2006.01) | |

(52) U.S. Cl.
CPC .......... *H04L 45/48* (2013.01); *H04L 12/1863* (2013.01); *H04L 41/0668* (2013.01); *H04L 41/12* (2013.01); *H04L 41/30* (2013.01); *H04L 45/60* (2013.01); *H04L 12/66* (2013.01); *H04L 43/0817* (2013.01); *H04L 45/02* (2013.01); *H04L 45/16* (2013.01); *H04L 45/583* (2013.01)

(58) Field of Classification Search
None
See application file for complete search history.

(56) References Cited

U.S. PATENT DOCUMENTS

2008/0049763 A1* 2/2008 Damm ................ H04L 12/4625
370/400
2009/0268607 A1 10/2009 Wang et al.
(Continued)

FOREIGN PATENT DOCUMENTS

CN 102801632 A 11/2012
CN 103227724 A 7/2013

OTHER PUBLICATIONS

CISCO, "IP Multicast: PIM Configuration Guide", Cisco IPS Release 15S, Dec. 22, 2013, 6 pages.

*Primary Examiner* — Nicholas Sloms
(74) *Attorney, Agent, or Firm* — Tong, Rea, Bentley & Kim, LLC

(57) ABSTRACT

In example implementations, a method is provided. The method detects, by a processor, an assignment of a master router role for a virtual router redundancy protocol (VRRP), a protocol independent multicast (PIM) designated router (DR) role for a PIM protocol, and a querier router role for an internet group management protocol (IGMP) to different routers in a network. A communication procedure is initiated to identify which routers of the routers are assigned to the master router role, the DR role and the querier router role. The master router role, the DR role and the querier router role are then automatically aligned to a single router of the routers via an ordered communication exchange.

19 Claims, 5 Drawing Sheets

(56) References Cited

U.S. PATENT DOCUMENTS

| | | | |
|---|---|---|---|
| 2014/0347976 A1* | 11/2014 | Keesara | H04L 45/586 370/219 |
| 2015/0085640 A1 | 3/2015 | Song | |
| 2015/0341183 A1* | 11/2015 | Song | H04L 12/1886 370/390 |
| 2016/0277509 A1* | 9/2016 | Qiang | H04L 67/16 |

* cited by examiner

AUTOMATIC ALIGNMENT OF ROLES OF ROUTERS IN NETWORKS

BACKGROUND

Networks are deployed to provide communications between endpoint devices. The networks may include a variety of different components to operate. For example, the network may include routers, switches, gateways, firewalls, and the like. The networks may include different sub-networks such as a core network, an access network, and the like.

The networks may also have different communication protocols. For example, some networks may be unicast (e.g., one to one communications), while other networks may be multicast (e.g., one to many communications). The networks may use a complicated series of messages between the network devices within the network to properly forward data packets to a desired destination endpoint device.

DETAILED DESCRIPTION

Examples described herein provide a method for automatic alignment of roles of routers in networks. As discussed above, networks may have different communication protocols. For example, some networks may be unicast (e.g., one to one communications), while other networks may be multicast (e.g., one to many communications). The networks may use a complicated series of messages between the network devices within the network to properly forward data packets to a desired destination endpoint device.

Multicast communication protocols may be more complicated than unicast communication protocols. In multicast communication protocols, there may be different layers of protocols that are implemented. In addition, each layer may have different roles that may be designated to a router. When the different roles of the different protocols in the multicast communication network are not aligned, the network may work inefficiently by exchanging unnecessary messages or failing to properly forward data packets to a desired destination endpoint device.

Examples herein provide a method for automatically aligning roles of routers in a network that can be performed by a centralized controller or by a local router. As a result, when a misalignment of roles between different routers is detected, the centralized controller or a local router may automatically initiate a process to align the roles of different communication protocols with a single router.

Figure 1:
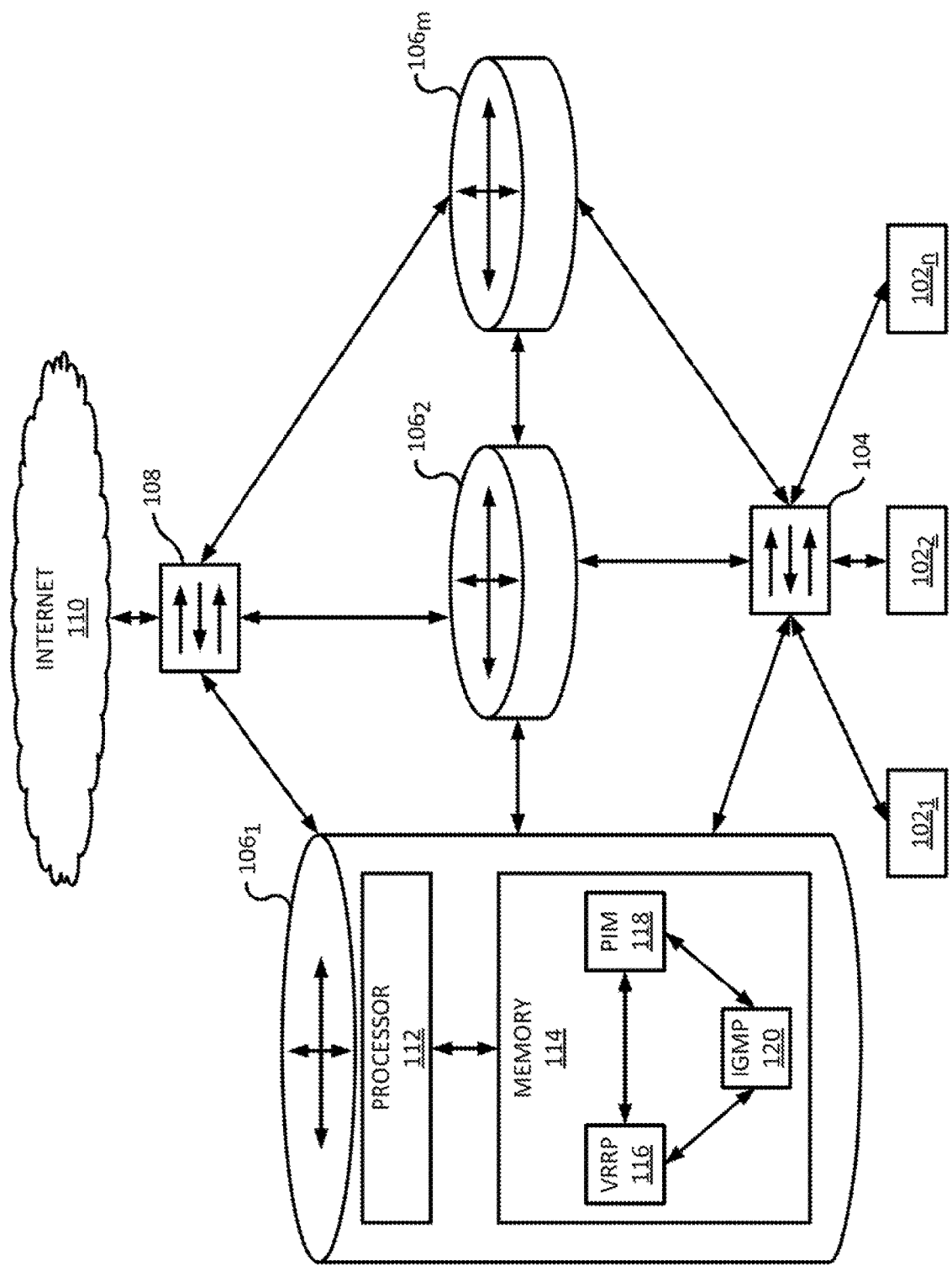
FIG. 1 is a block diagram of an example network of the present disclosure.

FIG. 1 illustrates an example network 100 of the present disclosure. The network 100 may include host devices $102_1$ to $102_n$ (hereinafter referred to individually as a host device 102 or collectively as host devices 102), a first switch 104, routers $106_1$ to $106_m$ (hereinafter referred to individually as a router 106 or collectively as routers 106), and a second switch 108. The host devices 102, the first switch 104, the routers 106, and the second switch 108 may be communicatively coupled to one another.

Although a certain number of host devices 102, switches 104 and 108, and routers 106 are illustrated in FIG. 1, it should be noted that any number of host devices 102, switches 104 and 108, and routers 106 may be deployed. It should be also noted that FIG. 1 has been simplified for ease of explanation and may include additional network devices that are not shown. For example, the network 100 may also include destination devices, gateways, firewalls, border elements, and the like.

The host devices 102, switches 104 and 108, and routers 106 may each include a processor and a memory to store instructions executed by the processor. In one example, the host devices 102 may be computers or servers that broadcast multicast data packets over the Internet 110. In one example, the host devices 102 may be in communication with the first switch 104.

The first switch 104 may forward the data packets to one of the routers $106_1$ to $106_m$ using multicast communications via a variety of different communication protocols, as discussed in further detail below. The routers $106_1$ to $106_m$ may then forward data packets over the Internet 110 via the second switch 108.

In one example, each one of the routers 106 may include a processor 112, and a memory 114. The processor may be communicatively coupled to the memory 114. The memory 114 may be a non-transitory computer readable storage medium or storage device such as a hard disk drive, a random access memory (RAM), a read-only memory (ROM), and the like. The memory 114 may store instructions executed by the processor to perform operations.

In one example, the memory 114 may store a virtual router redundancy protocol (VRRP) module 116, a protocol independent multicast (PIM) module 118, and an internet group management protocol (IGMP) module 120. The VRRP module 116 may store instructions that are executed by the processor 112 to implement or enable VRRP. The PIM module 118 may store instructions that are executed by the processor 112 to implement or enable a PIM protocol. The IGMP module 120 may store instructions that are executed by the processor 112 to implement or enable IGMP.

In one example, the routers 106 may operate in accordance with the plurality of different communication protocols. Each one of the protocols may have a particular role for forwarding data packets for the respective protocols. For example, the VRRP may have a master router role, the PIM protocol may have a PIM designated router (DR) role, and the IGMP may have a querier. The VRRP module 116 may store values in a priority field to identify the master router role. The PIM module 118 may store priority values in a PIM DR priority field to identify the PIM DR role. The IGMP may module 120 track whether a querier function is enabled on a respective router 106. The VRRP module 116, the PIM module 118 and the IGMP module 120 may exchange messages to identify values, identify roles, and enable functions.

In one example, the master router role may be the router 106 that has the highest value in a priority field for VRRP. If there is a tie, the router 106 with the higher Internet protocol (IP) address may be selected as the master. The DR for the PIM protocol may be the router with the highest DR priority value in the DR priority field for the PIM protocol. In the IGMP, the router with the lowest IP address may be selected for the querier role. In one example, the querier role may follow the DR role, and the DR role may follow the master router role. In another example, the order may be reversed such that the master role follows the DR role, and the DR role follows the querier role.

The routers 106 may exchange messages with the information collected from the modules 116, 118, and 120 within each respective router 106 to identify which routers 106 have which roles. The messages may be exchanged in a particular order based on the order that the communication protocols were enabled to initiate a process to align the roles to a single router 106.

When different routers 106 are assigned with the master router role, the DR role and the querier, the network 100 may operate inefficiently. For example, excessive messages may be exchanged between the first switch 104 and the different routers 106 performing the different roles which may lead to network congestion. Thus, the present disclosure performs a method to ensure that the roles are aligned to a single router. In other words, the same router (e.g., router $106_1$) may be the master router, the DR and the querier. As a result, the first switch 104 may communicate with the same router for all of the communication protocols and allow the network 100 to operate more efficiently.

Figure 2:
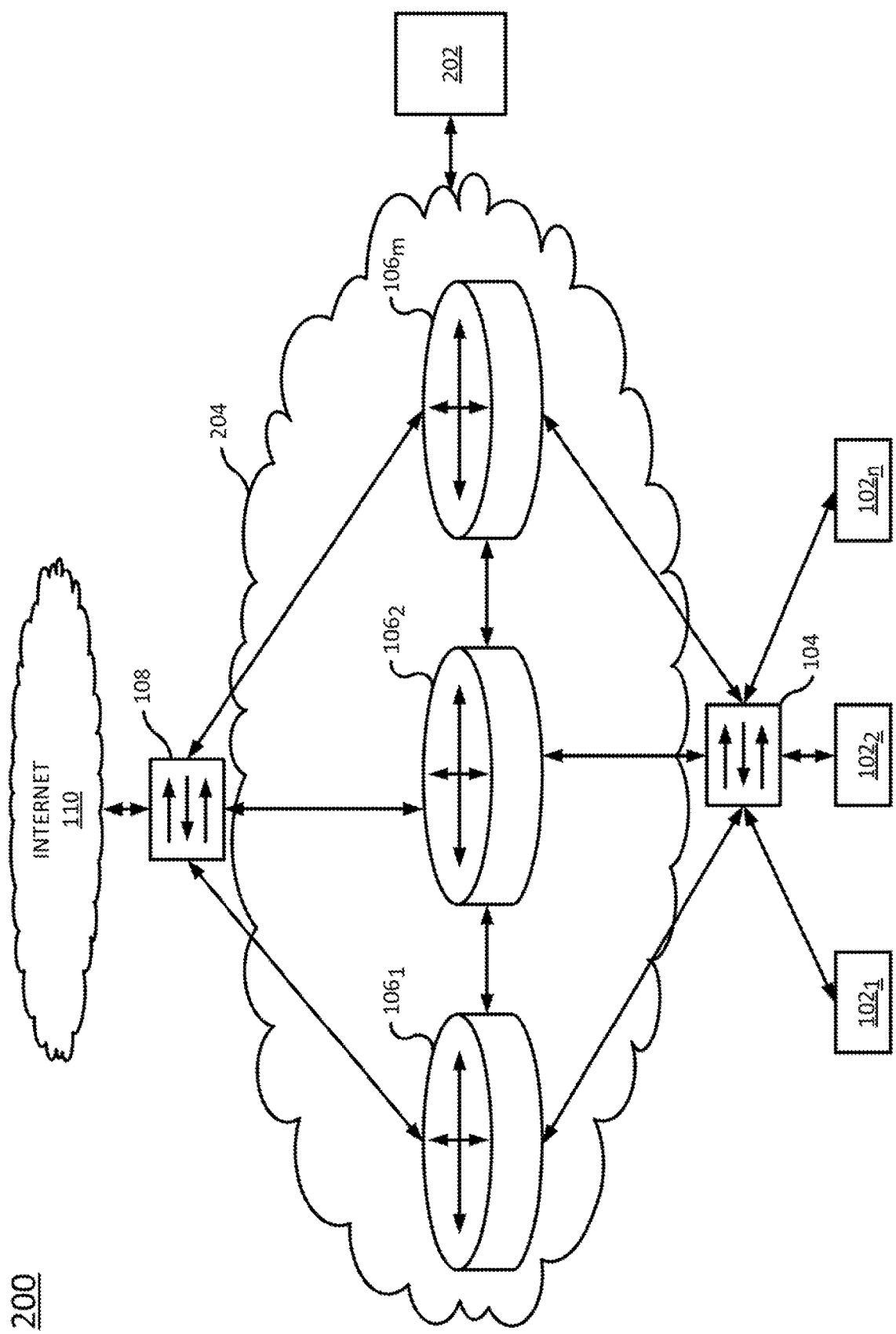
FIG. 2 is another block diagram of an example network of the present disclosure that includes a centralized controller.

In the example illustrated in FIG. 1, the routers 106 may detect the misalignment of roles, initiate a communication process to identify which routers have which roles, and align the roles to a single router. In another example, illustrated in FIG. 2, a centralized controller 202 may monitor a network 200.

The network 200 may be identical to the network 100 illustrated in FIG. 1, except the addition of the centralized controller 202. In one example, the centralized controller 202 may include a processor and a memory to store instructions that are executed by the processor.

In one example, the centralized controller 202 may communicate with the routers 106. For example, the routers 106 may be organized into a virtual local area network (VLAN) 204. The centralized controller 202 may monitor the assignment of roles associated with the plurality of different communication protocols in the VLAN 204. When a misalignment of the roles is detected, the centralized controller 202 may initiate a process to align the roles to a single router in the network 200. Examples of the process to align the roles are illustrated in FIGS. 3 and 4 and discussed below.

Figure 3:
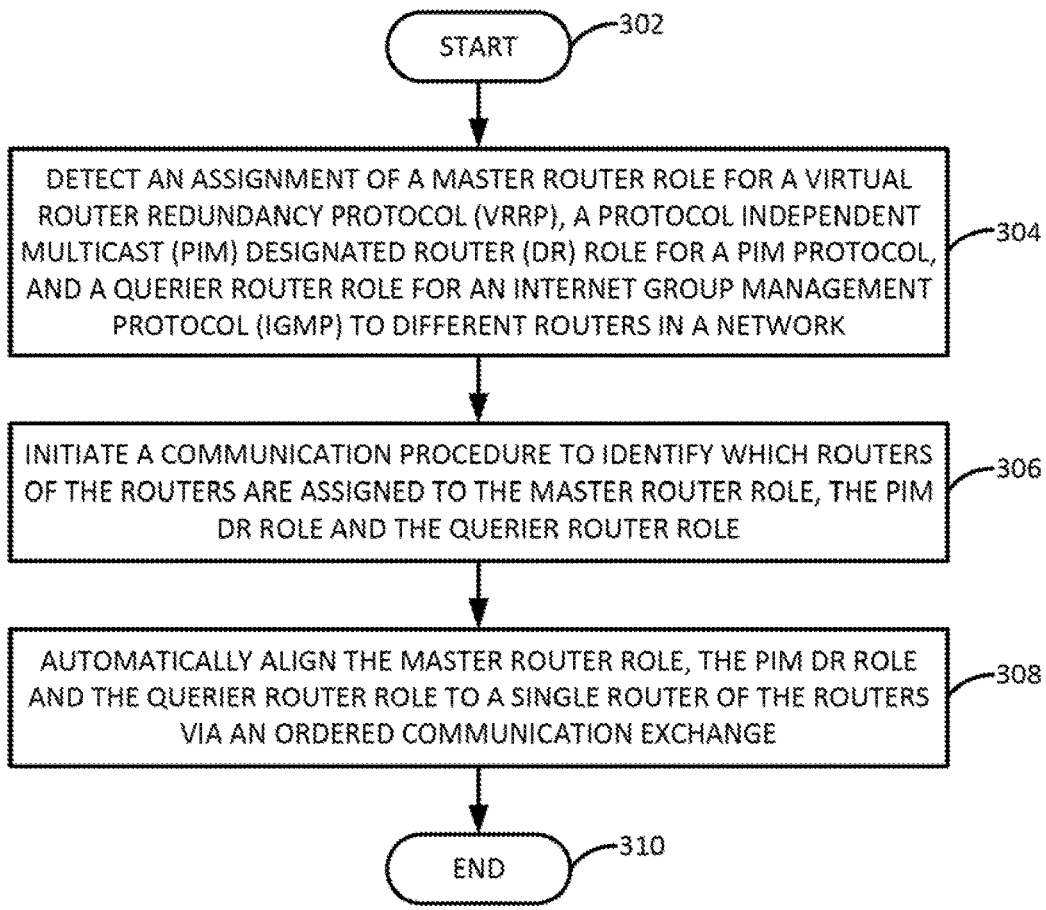
FIG. 3 is a flow chart of an example method for aligning a plurality of roles to a single router in the network.
Figure 4:
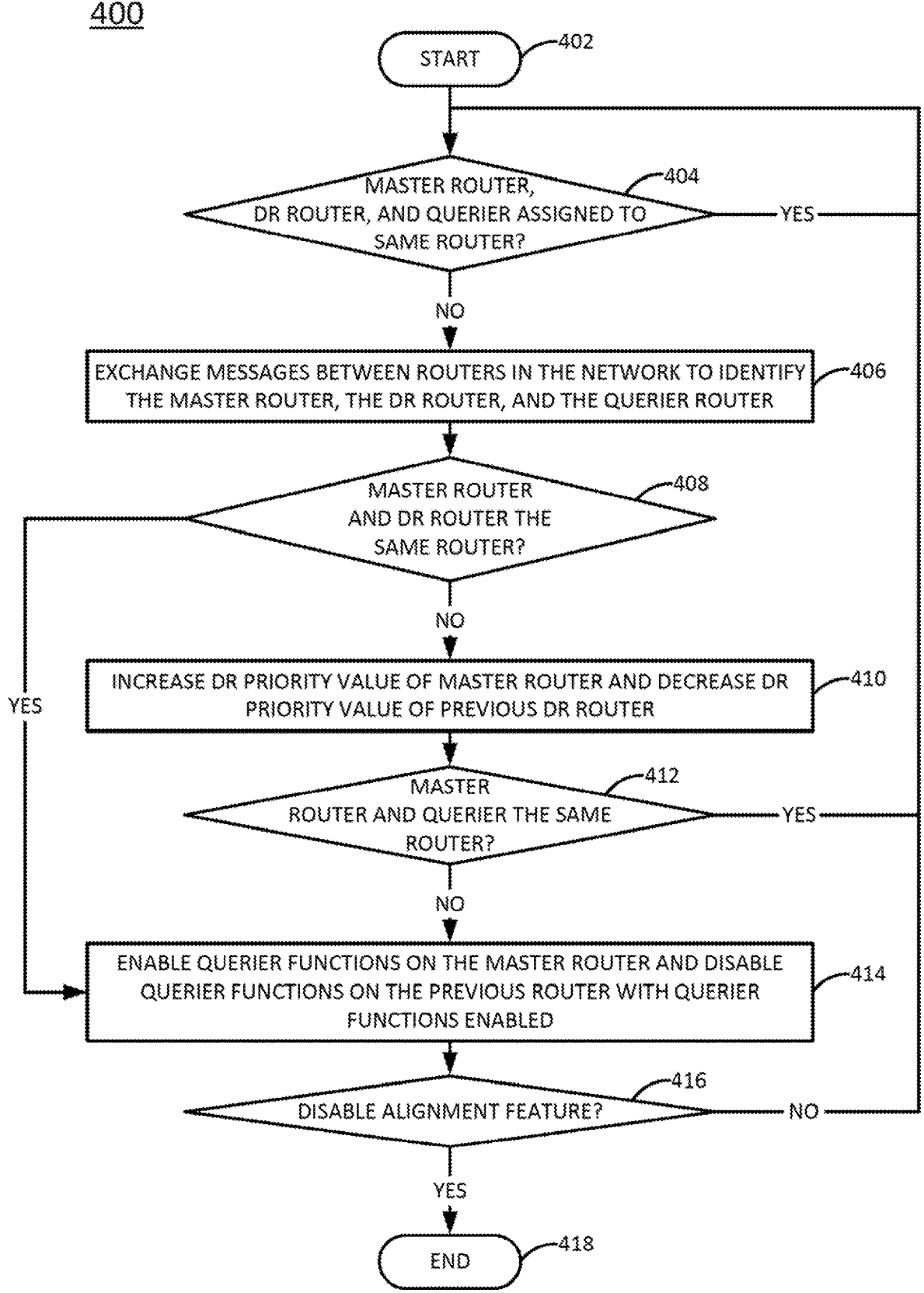
FIG. 4 is a flow chart of another example method for aligning a plurality of roles to a single router in the network.

FIG. 3 illustrates a flow diagram of an example method 300 for aligning a plurality of roles to a single router in the network. In one example, the method 300 may be performed by one of the routers 106, the centralized controller 202 or the apparatus 500 illustrated in FIG. 5 and described below.

At block 302, the method 300 begins. At block 304, the method 300 detects an assignment of a master router role for a virtual router redundancy protocol (VRRP), a designated router (DR) role for a protocol independent multicast (PIM) protocol, and a querier router role for an internet group management protocol (IGMP) to different routers in a network. For example, referring to FIG. 1, the network 100 may implement a VRRP, a PIM protocol and an IGMP. The master router for the VRRP may be the router $106_1$. The DR for the PIM protocol may be the router $106_2$. The querier for the IGMP may be the router $106_m$. In one embodiment, the routers 106 may detect that the router is not assigned with all three roles and assume that there is a misalignment of the roles. In another example, the centralized controller 202 illustrated in FIG. 2 may monitor the roles assigned to the router 106.

At block 306, the method 300 initiates a communication procedure to identify which routers of the routers are assigned to the master router role, the DR role and the querier router role. In one example, the routers 106 may exchange messages (e.g., PIM HELLO messages) with other routers. The messages may exchange parameters associated with each router 106 to determine which router should be assigned the master role, the DR role and the querier role. For example, the parameters may include a priority number, a DR priority number, an Internet protocol (IP) address, a current role, a status, and the like. The information may be collected internally at each router 106 from the respective VRRP module 114, the respective PIM module 118, and the respective IGMP module 120.

At block 308, the method 300 automatically aligns the master router role, the DR role and the querier router role to a single router of the routers via an ordered communication exchange. In one example, the ordered communication exchange to determine how the router is selected to perform the master role, the DR role and the querier role may depend on the order in which the communication protocols are implemented.

For example, for an interaction of routers between a VRRP-PIM protocol, if the PIM protocol was enabled after the VRRP, each router 106 in the PIM protocol may read the VRRP status of itself and receive the VRRP status from the other routers 106. The router 106 with the highest value of a priority field may assume the role of the master router and send a "PIM HELLO" packet to the other routers indicating that it has the highest value of the priority field. The router 106 with the highest value of the priority field would also become the DR.

If the VRRP was enabled after the PIM protocol, the routers 106 would send a notification to other routers in the PIM protocol about the status of each respective router 106. If the router 106 in PIM protocol is the master router, the router 106 would increase the DR priority value to a highest value. If the router 106 in PIM protocol is the DR, but is not the master in VRRP (e.g. a backup), then the router 106 would reduce the DR priority value to the lowest value.

In one example, for an interaction of routers between a PIM protocol and IGMP, if the PIM protocol is enabled after IGMP the routers under PIM protocol may send their respective enable status (e.g., whether the router under the PIM protocol is the DR) to the other routers. If the router is not the querier under IGMP and the querier functionality is not disabled on the switch 104, then the switch 104 may send out two consecutive "IGMP All Host Queries," which may trigger the querier election process. The router 106 that is the PIM DR under the PIM protocol may be selected as the querier and enable the querier functionality, while other routers 106 would disable querier functionality.

In one example, the master router and PIM DR may have a higher IP address than the router that is currently the querier in IGMP. For example, the IP addresses may have been used to resolve a tie in a value of the priority field for selecting the master router in the VRRP. In this scenario, the switch may disable querier functionality for the routers such that no querier router role is assigned.

If the IGMP is enabled after the PIM protocol, each router under the IGMP would check to see if the PIM DR for the PIM protocol is in the same virtual local area network (VLAN). The PIM DR would enable querier functionality while other routers in the IGMP would disable querier functionality.

Both scenarios above assume that the querier is enabled on the first switch 104. In addition, the above scenarios assume that the querier would follow the PIM DR that is selected for the master role for VRRP. Finally, the above scenarios assume that VRRP, PIM protocol, and IGMP are enabled for the network 100 or 200.

However, if IGMP is not enabled (e.g., VRRP and PIM protocol enabled) the interaction would be the same as the VRRP-PIM protocol interaction described above. If VRRP is not enabled (e.g., PIM protocol and IGMP is enabled) the interaction would be the same as the PIM-IGMP interaction described above. At block 310, the method 300 ends.

FIG. 4 illustrates a flow diagram of an example method 400 for aligning a plurality of roles to a single router in the network. In one example, the method 400 may be performed by one of the routers 106, the centralized controller 202 or the apparatus 500 illustrated in FIG. 5 and described below.

At block 402, the method 400 begins. At block 404, the method 400 determines if a master router, the PIM DR router and the querier are assigned to the same router. For example, each router within the network may communicate with other routers in the network or a centralized controller may monitor the status of the routers in the network. If the answer to block 404 is yes, the method 400 may continuously loop within the block 404.

If the answer to block 404 is no, the method 400 may proceed to block 406. At block 406, the method 400 may exchange messages between routers in the network to identify the master router, the PIM DR router, and the querier. For example, the routers may exchange "PIM HELLO" messages that include parameters associated with each router. For example, the parameters may include a status of the router within a particular communication protocol (e.g., VRRP, PIM, or IGMP), an IP address, a value for a priority field, a value for a PIM DR priority field, and the like.

At block 408, the method 400 determines if the master router and the PIM DR router are the same router. If the answer is yes, the method 400 may proceed to block 414 since it may be assumed that the master router and the querier router are different routers. If the answer is no, the method 400 may proceed to block 410. At block 410, the method 400 may increase a DR priority value (e.g., a value for the PIM DR priority field) of the master router and decrease the PIM DR priority value of the previous PIM DR router.

For example, referring to FIG. 1, the router 106$_1$ may be determined to be the master router and the router 106$_2$ may be determined to be the PIM DR router. The router 106$_1$ may increase the value of the PIM DR priority field to a highest value and the router 106$_2$ may decrease the value of the PIM DR priority field to a lowest value. The method 400 may then proceed to block 412.

At block 412, the method 400 determines if the master router and the querier are the same router. If the answer to block 412 is yes, the method 400 may return to block 404. For example, the querier may follow the PIM DR router. Thus, when the PIM DR router was changed in block 410, the querier may also have been set as the master router.

If the answer to block 412 is no, the method 400 may proceed to block 414. At block 414 the querier functions may be enabled on the master router and the querier functions may be disabled on the previous router with the querier functions enabled. For example, referring to FIG. 1, the router 106$_1$ may have been set to the master router and PIM DR router, but the router 106$_2$ may be the querier. Thus, at block 414, the router 106$_1$ may enable querier functions and the router 106$_2$ may disable querier functions. The method 400 may then proceed to block 416.

At block 416, the method 400 determines whether the alignment feature should be disabled. For example, as long as the alignment feature is enabled, the method 400 may continuously loop between blocks 404-416. However, if the answer to block 416 is yes, the method 400 may proceed to block 418. At block 418, the method 400 ends.

The method 400 describes one example of an order of the communication exchange. However, it should be noted that the order may also be reversed depending on a sequence of when the VRRP, the PIM protocol and IGMP are enabled. For example, the PIM DR may be identified first and the IGMP may follow the PIM DR and the PIM DR may be assigned to the master router.

In one example, the method 300 and the method 400 may be executed using example messages described below. For example, a test mode command "IPM ulticastHierarchy {enable|disable}" may be created to enable or disable the alignment feature.

A VRRP router may provide a new public application programming interface (API) "PimGetVrrpMasterStatus" which may take the Interface index (ifIndex) and Internet Protocol version 4 (ipv4) address as a parameter and return true or false depending on the VRRP master status of the respective VRRP router. The ifIndex address may be a simple network management protocol (SNMP) based identifier that may be associated with a physical or a logical interface.

When the PIM protocol is enabled on a VLAN, the routers may call the above public API to check if the VRRP is enabled on the VLAN and the master router of the VRRP. If a router is the VRRP master, the router may send a "PIM HELLO" packet with a highest value of priority field to ensure that the VRRP router that is the master router also becomes the PIM DR in the PIM protocol.

When any VRRP router becomes the master router, the master router may post an event "EventInVrrpMasterNotify" to a PIM interface manager. This event may contain the ifIndex of the VRRP master interface. The event may be posted to a particular interface using the ifIndex PIM interface manager, which may cause the PIM interface to start sending "PIM HELLO" packets with the highest PIM DR priority. This may cause the PIM DR election to happen again for that interface and the router may become the PIM DR for the PIM protocol.

A new public API "Pim_GetInterfaceDrStatus" may be introduced in the PIM routers which takes ifIndex as a parameter and returns true or false depending on the PIM DR status of the respective router. When IGMP is enabled on the VLAN, the routers may check the PIM DR status of the PIM protocol on the VLAN by calling the "Pim_GetInterfaceDrStatus" API. If a router is not the PIM DR then the router may not start the querier election process. If a router is the PIM DR then the router may enable querier functions and start sending IGMP queries. This may allow the PIM DR to also become the IGMP querier.

When any router becomes the PIM DR for the PIM protocol, the router may post an event to the routers under the IGMP. Each router under IGMP may check to see if the router is not the querier and start sending IGMP All Host Queries for the VLAN. This may lead the querier election to happen again for that interface and the router may become the querier.

It should be noted the example API's and messages described above are one example of how the method 300 and/or 400 can be implemented. It should be noted that other implementations may exist for executing the method 300 and/or 400 within a network 100 or 200 of the present disclosure.

Figure 5:
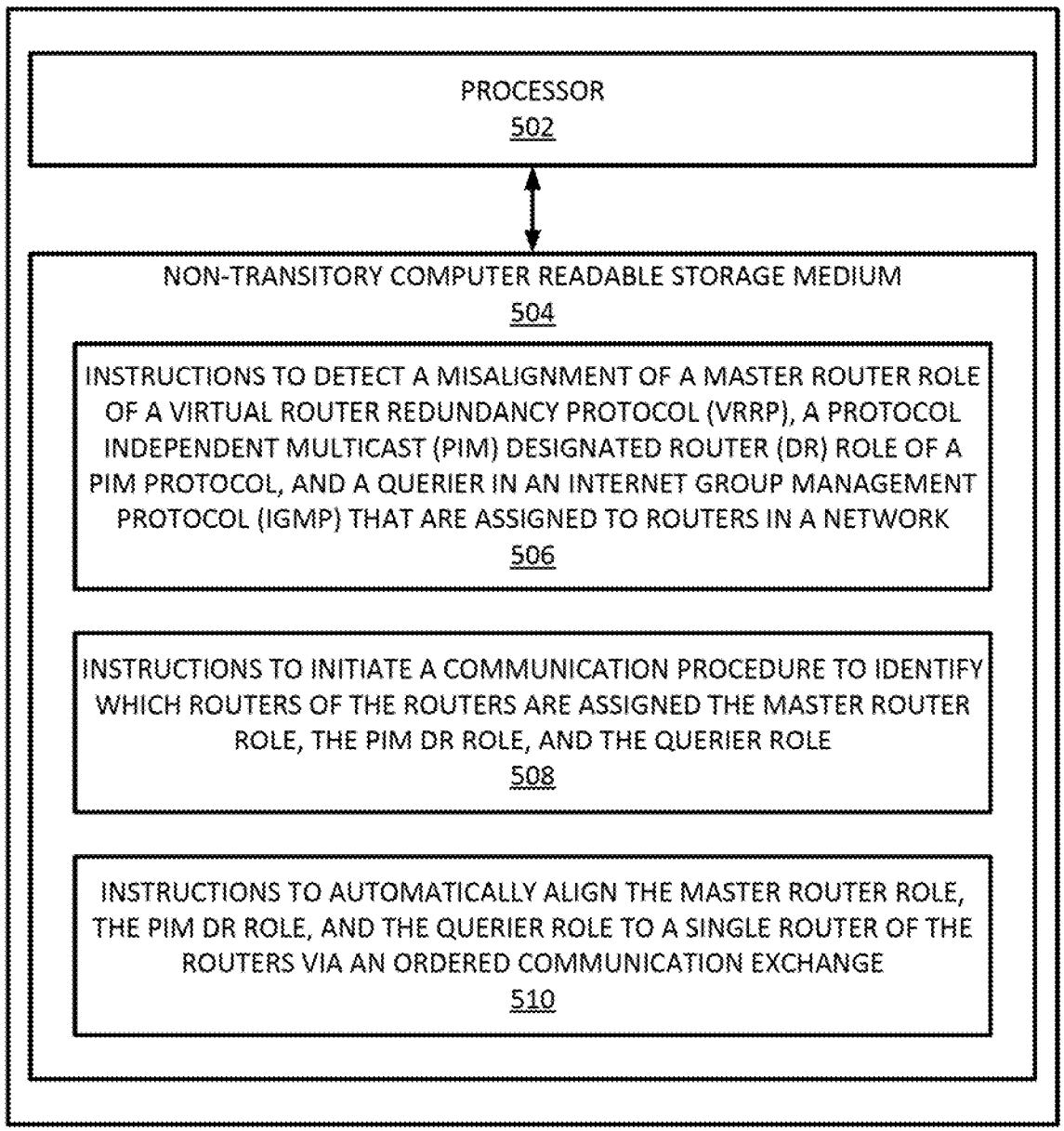
FIG. 5 is a block diagram of an example non-transitory computer readable storage medium storing instructions executed by a processor.

FIG. 5 illustrates an example of an apparatus 500. In one example, the apparatus 500 may be one of the routers 106 or the centralized controller 202. In one example, the apparatus 500 may include a processor 502 and a non-transitory computer readable storage medium 504. The non-transitory computer readable storage medium 504 may include instructions 506, 508, and 510 that, when executed by the processor 502, cause the processor 502 to perform various functions.

In one example, the instructions 506 may include instructions to detect a misalignment of a master router role of a virtual route redundancy protocol (VRRP), a protocol independent multicast (PIM) designated router (DR) role of a PIM protocol, and a querier in an internet group management protocol (IGMP) that are assigned to routers in a network. The instructions 508 may include instructions to initiate a communication procedure to identity which routers of the routers are assigned the master router role, the PIM DR role, and the querier role. The instructions 510 may include instructions to automatically align the master router role, the PIM DR role, and the querier role to a single router of the routers via an ordered communication exchange.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
monitoring, by a processor, a respective router in a network to obtain an assignment of a role for a virtual router redundancy protocol (VRRP), a role for a protocol independent multicast (PIM) protocol, and a role for an internet group management protocol (IGMP);
determining, by the processor based on the monitoring, that a VRRP master router role, a PIM designated router (DR) role, and an IGMP querier router role have been assigned to at least two distinct routers in the network; and
automatically aligning, by the processor, the VRRP master router role, the PIM DR role and the IGMP querier router role to a single router of the distinct routers, including:
allocating, by the processor, a highest priority value or a highest IP address to an interface;
setting, by the processor, a PIM DR priority value of the single router to the highest priority value; and
enabling, by the processor, an IGMP querier functionality on the single router.

2. The method of claim 1, wherein the processor resides in one of the routers in the network.

3. The method of claim 1, wherein the processor resides in a centralized controller of the network.

4. The method of claim 1, further comprising selecting the single router of the distinct routers based on an order at which the VRRP, the PIM protocol, and the IGMP are enabled.

5. The method of claim 1, wherein the IGMP querier router role follows the PIM DR role and the PIM DR role follows the VRRP master router role.

6. The method of claim 1, wherein automatically aligning further comprises:
identifying, by the processor, a first router that is assigned the VRRP master router role;
identifying, by the processor, a second router that is assigned the PIM DR router role; and
identifying, by the processor, a third router that is assigned the IGMP querier router role.

7. The method of claim 6, wherein the VRRP master router role is identified via an interface with a highest priority value or a highest Internet protocol (IP) address.

8. The method of claim 6, wherein the PIM DR router role is identified via an exchange of PIM HELLO messages sent by the routers in the network using the PIM protocol to identify a highest DR priority value.

9. The method of claim 6, wherein the IGMP querier router role is identified via a lowest Internet protocol (IP) address.

10. A non-transitory computer readable storage medium encoded with instructions that when executed by a processor cause the processor to perform a method, the method comprising:
monitoring a respective router in a network to obtain an assignment of a role for a virtual router redundancy protocol (VRRP), a role for a protocol independent multicast (PIM) protocol, and a role for an internet group management protocol (IGMP);
determining, based on the monitoring, that a VRRP master router role, a PIM designated router (DR) role, and an IGMP querier router role have been assigned to at least two distinct routers in the network; and
automatically aligning the VRRP master router role, the PIM DR role, and the IGMP querier router role to a single router of the distinct routers, including:
allocating a highest priority value or a highest IP address to an interface;
setting a PIM DR priority value of the single router to the highest priority value; and
enabling an IGMP querier functionality on the single router.

11. The non-transitory computer readable storage medium of claim 10, wherein the processor resides in one of the routers in the network or a centralized controller of the network.

12. A system, comprising: a processor; and a memory coupled to the processor and storing instructions, which when executed by the processor cause the processor to perform a method, the method comprising: monitoring a respective router of a plurality of routers in a network to obtain an assignment of a role for a virtual router redundancy protocol (VRRP), a role for a protocol independent multicast (PIM) protocol, and a role for an internet group management protocol (IGMP); determining, based on the monitoring, that a VRRP master router role, a PIM designated router (DR) role, and an IGMP querier router role have been assigned to at least two distinct routers in the network; and automatically aligning the VRRP maser router role, the PIM DR role, and the IGMP querier role to a single router of the plurality of the distinct routers, including: allocating a highest priority value or a highest IP address to an interface; setting a PIM DR priority value of the single router to the highest priority value; and enabling an IGMP querier functionality on the single router.

13. The system of claim 12, wherein the method further comprises selecting the single router of the distinct routers based on an order at which the VRRP, the PIM protocol, and the IGMP are enabled.

14. The system of claim 12, wherein the system operates as a router of the plurality of routers or a centralized controller of the network.

15. The non-transitory computer readable storage medium of claim 10, wherein the method further comprises selecting the single router of the distinct routers based on an order at which the VRRP, the PIM protocol, and the IGMP are enabled.

16. The non-transitory computer readable storage medium of claim 10, wherein automatically aligning further comprises:
   identifying, by the processor, a first router that is assigned the VRRP master router role;
   identifying, by the processor, a second router that is assigned the PIM DR router role; and
   identifying, by the processor, a third router that is assigned the IGMP querier router role.

17. The non-transitory computer readable storage medium of claim 16, wherein the VRRP master router role is identified via an interface with a highest priority value or a highest Internet protocol (IP) address;
   wherein the PIM DR router role is identified via an exchange of PIM HELLO messages sent by the routers in the network using the PIM protocol to identify a highest DR priority value; and
   wherein the IGMP querier router role is identified via a lowest Internet protocol (IP) address.

18. The non-transitory computer readable storage medium of claim 10, wherein the automatically aligning further comprises one or more of:
   allocating, by the processor, a highest priority value or a highest IP address to an interface;
   setting, by the processor, a PIM DR priority value of the single router to the highest priority value; and
   enabling, by the processor, an IGMP querier functionality on the single router.

19. The system of claim 12, wherein automatically aligning further comprises:
   identifying, by the processor, a first router that is assigned the VRRP master router role;
   identifying, by the processor, a second router that is assigned the PIM DR router role; and
   identifying, by the processor, a third router that is assigned the IGMP querier router role.

\* \* \* \* \*